(12) United States Patent
Murai et al.

(10) Patent No.: US 11,060,699 B2
(45) Date of Patent: Jul. 13, 2021

(54) ILLUMINATION DEVICE

(71) Applicants: KYOTO UNIVERSITY, Kyoto (JP); STANLEY ELECTRIC CO., LTD., Tokyo (JP)

(72) Inventors: Shunsuke Murai, Kyoto (JP); Yusuke Yokobayashi, Tokyo (JP); Masaru Kuramoto, Tokyo (JP); Keijiro Takashima, Tokyo (JP); Syousaku Kubo, Tokyo (JP)

(73) Assignees: KYOTO UNIVERSITY, Kyoto (JP); STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/491,568

(22) PCT Filed: Mar. 2, 2018

(86) PCT No.: PCT/JP2018/008039
§ 371 (c)(1),
(2) Date: Sep. 5, 2019

(87) PCT Pub. No.: WO2018/163994
PCT Pub. Date: Sep. 13, 2018

(65) Prior Publication Data
US 2020/0386386 A1    Dec. 10, 2020

(30) Foreign Application Priority Data
Mar. 6, 2017 (JP) .............................. JP2017-041767

(51) Int. Cl.
*G02B 27/09* (2006.01)
*F21V 9/30* (2018.01)
(Continued)

(52) U.S. Cl.
CPC ................ *F21V 9/30* (2018.02); *F21V 5/007* (2013.01); *F21Y 2115/10* (2016.08); *G02B 27/0927* (2013.01)

(58) Field of Classification Search
CPC ... F21V 9/30; F21V 5/007; F21K 9/64; F21K 9/68; F21K 9/65; G02B 5/1809; G02B 5/008; G02B 27/0927; G02B 27/0916
See application file for complete search history.

(56) References Cited

U.S. PATENT DOCUMENTS

2013/0286633 A1*  10/2013  Rodriguez .......... C09K 11/883
                                                      362/84
2014/0369064 A1   12/2014  Sakaue et al.
(Continued)

FOREIGN PATENT DOCUMENTS

| JP | 2014508379 A | 4/2014 |
|----|--------------|--------|
| JP | 2015002160 A | 1/2015 |
| WO | 2016208644 A1 | 12/2016 |

OTHER PUBLICATIONS

Chinese Office Action (and English language translation thereof) dated May 25, 2020 issued in Chinese Application No. 201880023978.6.

(Continued)

*Primary Examiner* — Anabel Ton
(74) *Attorney, Agent, or Firm* — Holtz, Holtz & Volek PC

(57) ABSTRACT

An illumination device includes a light source configured to generate primary light having a Gaussian intensity distribution, an intensity-distribution converting member configured to convert the primary light to generate secondary light having a top-hat type intensity distribution, a wavelength converter configured to receive the secondary light from a light-receiving surface, generate tertiary light including the secondary light and wavelength-converted light in which a wavelength of the secondary light has been converted, and (Continued)

emit the tertiary light from an emission surface, and an antenna array having a plurality of optical antennas formed on the emission surface of the wavelength converter and arranged at a period larger than an optical wavelength of the secondary light in the wavelength converter.

14 Claims, 10 Drawing Sheets

(51) Int. Cl.
  *F21V 5/00* (2018.01)
  *F21Y 115/10* (2016.01)

(56) References Cited

U.S. PATENT DOCUMENTS

| | | |
|---|---|---|
| 2016/0010813 A1 | 1/2016 | Rodriguez et al. |
| 2016/0190403 A1 | 6/2016 | Verschuuren et al. |
| 2016/0363274 A1 | 12/2016 | Rodriguez et al. |
| 2017/0003001 A1 | 1/2017 | Sakaue et al. |
| 2017/0288098 A1 | 10/2017 | Rodriguez et al. |
| 2020/0025341 A1* | 1/2020 | Murai .................. F21K 9/68 |

OTHER PUBLICATIONS

International Search Report (ISR) dated May 15, 2018 issued in International Application No. PCT/JP2018/008039.
Written Opinion dated May 15, 2018 issued in International Application No. PCT/JP2018/008039.
Extended European Search Report (EESR) dated Dec. 21, 2020, issued in counterpart European Application No. 18764185.7.
Japanese Office Action (and English language translation thereof) dated Jan. 26, 2021 issued in counterpart Japanese Application No. 2017-041767.

\* cited by examiner (a)

(b)

(a)

(b)

(a)

(b)

(a)

(b)

(a)

(b)

ILLUMINATION DEVICE

TECHNICAL FIELD

The present invention relates to an illumination device.

BACKGROUND ART

Conventionally, there has been known an illumination device in which a light source that emits light having a predetermined wavelength (emission color) and a wavelength converter that converts the wavelength of light from the light source and outputs the resulting light are combined. In addition, there is known an illumination device for controlling a light distribution (directivity) of illumination light. For example, Patent Literature 1 discloses an illumination device having a light source, a wavelength conversion medium, and a periodic antenna array.

CITATION LIST

Patent Literature

Patent Literature 1: Japanese Translation of PCT Patent Application Publication No. 2014-508379

SUMMARY OF INVENTION

Technical Problem

In an illumination device including a wavelength converter, light outputted from a light source and transmitted through the wavelength converter and light of which wavelength has been converted by the wavelength converter are outputted as illumination light. Therefore, the illumination light is obtained as light in which a plurality of light rays having different wavelength bands are mixed. In order to reduce the color unevenness of the illumination light, it is preferable that the ratio (mixing ratio) of the light transmitted through the wavelength converter and the light of which wavelength has been converted in each radiation direction of the illumination light be constant. In consideration of surely irradiating the illumination light to a desired region, it is preferable that the light outputted from the illumination device (illumination light) have a desired directivity (narrow angle orientation).

For example, a laser light source such as a semiconductor laser used as a light source can generate high-power and high-density light, so that the illumination device can be miniaturized. In addition, since the light emitted from the laser light source has high rectilinearity and can enhance the incident efficiency to the wavelength converter and the lens, the efficiency of the illumination device can be increased. On the other hand, since the light of which wavelength has been converted by the wavelength converter is emitted from the wavelength converter with a different light distribution from that of the laser light, the ratio (mixing ratio) of the light transmitted through the wavelength converter and the light of which wavelength has been converted differs depending on the radiation direction, and color unevenness of the illumination light may occur.

Light from a semiconductor laser such as an edge emitting laser (FP-LD), a vertical cavity surface emitting laser (VCSEL), and a photonic crystal surface emitting laser (PCSEL) has a Gaussian-type intensity distribution. Therefore, for example, high-density light enters a partial region of the wavelength converter, and so the temperature of the wavelength converter rises in the partial region. When the temperature of the wavelength conversion medium exceeds a predetermined temperature, the wavelength conversion efficiency rapidly decreases. If so-called temperature quenching of the wavelength converter like this occurs, the efficiency of the illumination device is also reduced. Further, from the region where the temperature quenching has occurred, the laser light as it is passes through the wavelength converter, and there is a risk of color separation of the illumination light and emission of the laser light to the outside of the illumination device. Therefore, not only the color unevenness of the illumination light (color mixture unevenness) occurs, but also the efficiency reduction and the risk of the illumination device may occur.

The present invention has been made in view of the foregoing circumstances, and it is an object of the present invention to provide an illumination device capable of suppressing color unevenness and efficiency degradation of illumination light and obtaining high directivity and light extraction efficiency.

Solution to Problem

An illumination device according to the present invention comprises: a light source configured to generate primary light having a Gaussian intensity distribution; a shaping member configured to shape the primary light to generate secondary light having a top-hat type intensity distribution; a wavelength converter configured to receive the secondary light from a light-receiving surface, generate tertiary light including the secondary light and wavelength-converted light in which a wavelength of the secondary light has been converted, and emit the tertiary light from an emission surface; and an antenna array having a plurality of optical antennas formed on the emission surface of the wavelength converter and arranged at a period larger than an optical wavelength of the secondary light in the wavelength converter.

DESCRIPTION OF EMBODIMENTS

Hereinafter, embodiments of the present invention will be described in detail.

First Embodiment

Figure 1:
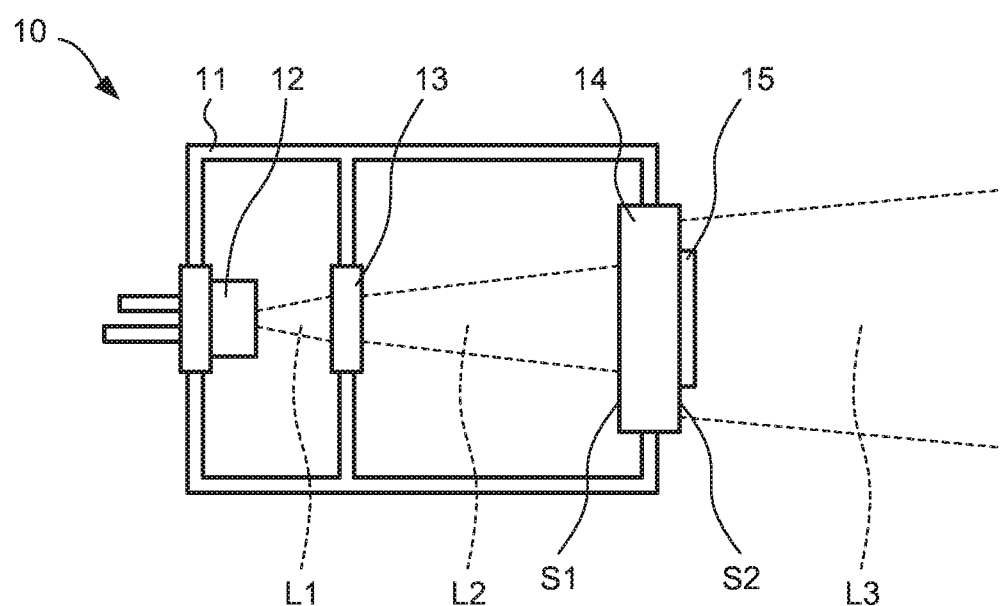
FIG. 1 is a diagram schematically showing a configuration of an illumination device according to a first embodiment.

FIG. 1 is a diagram showing a configuration of an illumination device 10 according to a first embodiment. Although hatching is omitted, FIG. 1 is a schematic cross-sectional view of the illumination device 10. The illumination device 10 includes a light source 12, a shaping member 13, a wavelength converter 15, and an antenna array 14, which are accommodated in a housing body 11. In the present embodiment, a case where the light source 12 is a laser light source such as a semiconductor laser will be described. However, the light source 12 may include other light emitting elements such as light emitting diodes.

The light source 12 generates primary light L1. The shaping member 13 adjusts the intensity distribution of the primary light L1 to generate secondary light L2. The wavelength converter 14 receives the secondary light L2 from a light-receiving surface S1 thereof, and performs wavelength conversion on a part of the secondary light L2 to generate tertiary light L3. The wavelength converter 14 has an emission surface S2, and emits the tertiary light L3 from the emission surface 32. The antenna array 15 includes a plurality of fine optical antennas that are formed on the emission surface S2 of the wavelength converter 14 and periodically arranged.

In the present embodiment, an opening for fixing the light source 12 and an opening for fixing the wavelength converter 14 are provided in the housing body 11. The shaping member 13 is disposed between the light emitting portion of the light source 12 and the light-receiving surface S1 of the wavelength converter 14. Although not shown, the light source 12 may include a condenser lens or a collimator lens.

Figure 2:
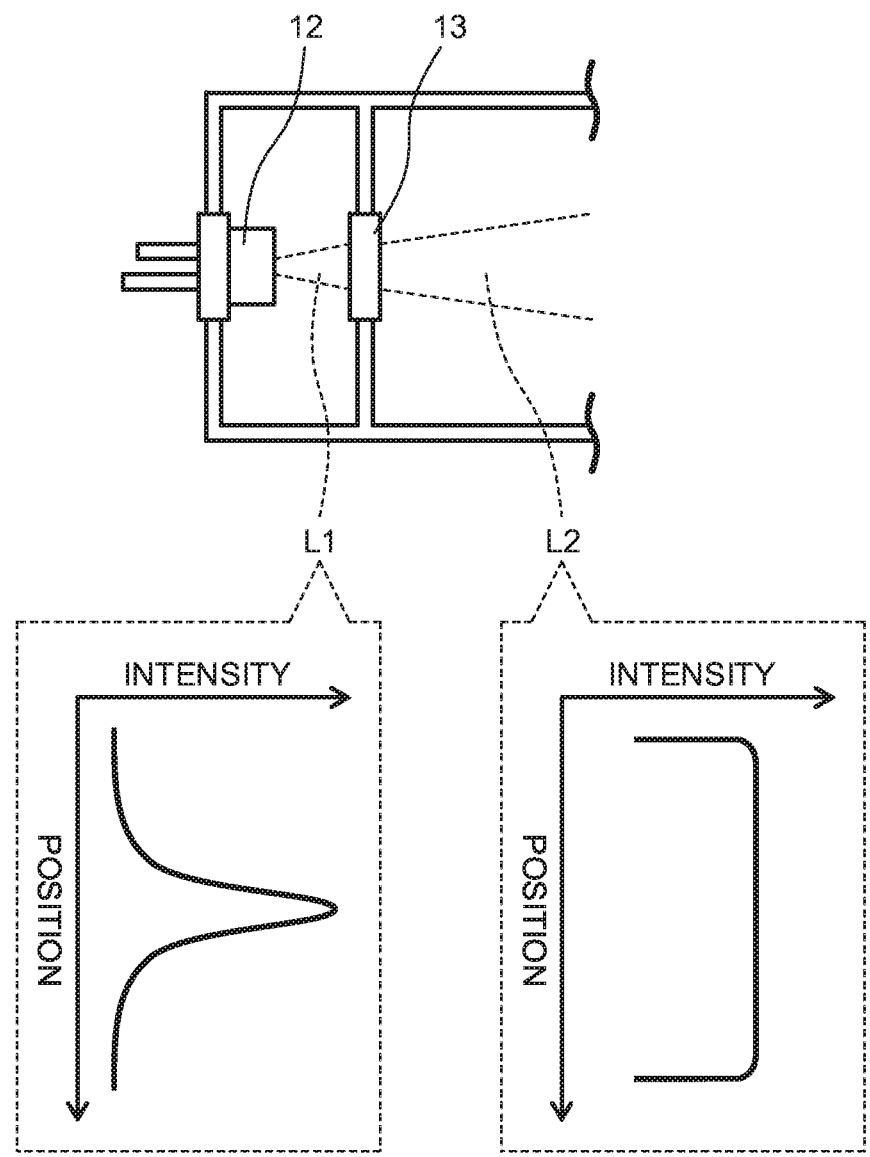
FIG. 2 is a diagram schematically showing configurations of a light source and a shaping member of the illumination device according to the first embodiment.

FIG. 2 is a diagram schematically showing configurations of the light source 12 and the shaping member 13. The light source 12 and the shaping means 13 will be described with reference to FIG. 2. In the present embodiment, the light source 12 generates the primary light L1 having a Gaussian intensity distribution, as shown in FIG. 2. The light source 12 generates, for example, laser light having a wavelength band (blue) of 440 nm to 460 nm as the primary light L1, and emits the laser light toward the shaping member 13.

The shaping member 13 shapes the primary light L1 to generate the secondary light L2 having a top-hat intensity distribution. That is, the shaping member 13 converts light components having a Gaussian intensity distribution into light components having a top-hat intensity distribution. For example, the secondary light L2 from the shaping member 13 is laser light with an intensity distribution having been uniformized. The shaping member 13 comprises an optical system including, for example, any of or a combination of: a microlens array (fly-eye lens), an aspheric lens, a diffractive optical device (DOE), and a beam homogenizer optical member such as a rod lens and an optical fiber.

For example, the beam homogenizer optical member not only can convert the intensity distribution of the Gaussian type into the intensity distribution of the top-hat type, but also can control the emission angle, the light distribution, and the irradiation shape of the secondary light L2. In addition, also by combining a beam homogenizer optical member with an optical member such as a concave lens, a convex lens, an aspherical lens, or the like, the shaping member 13 can generate the secondary light L2, which has a top-hat type intensity distribution and is shaped into a desired radiation angle, light distribution, or irradiation shape.

Figure 3:
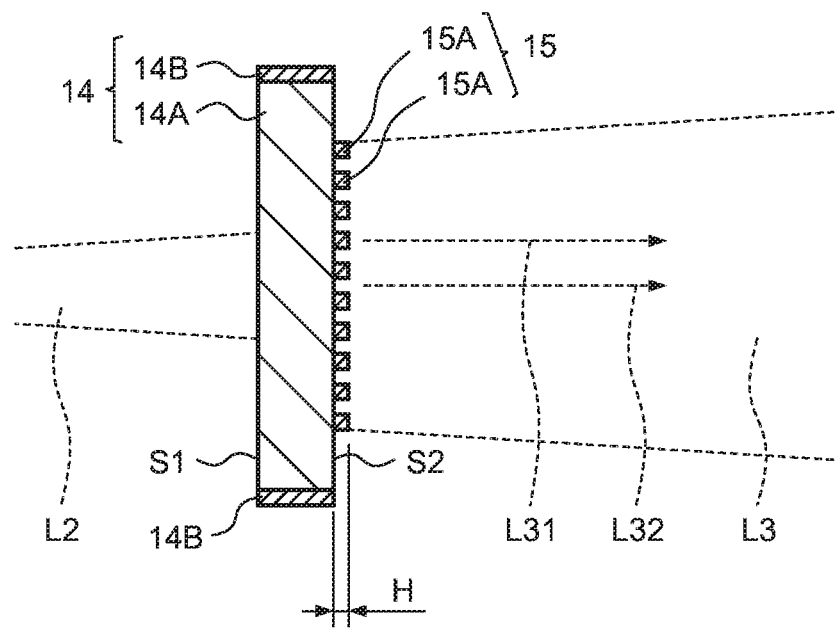
FIGS. 3(a) and 3(b) are a schematic cross-sectional view and a top view of a wavelength converter and an antenna array of the illumination device according to the first embodiment, respectively.
Figure 3:
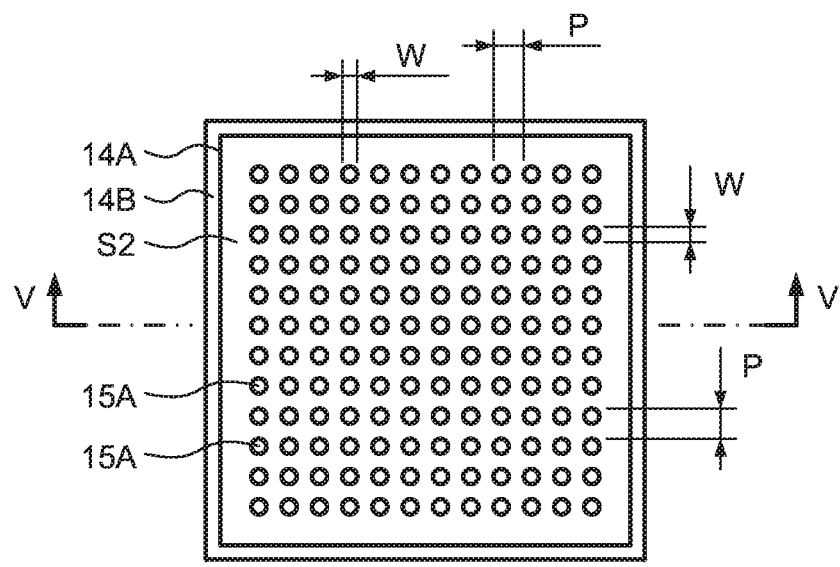

FIGS. 3(a) and (b) are a schematic cross-sectional view and a top view of the wavelength converter 14 and the antenna array 15, respectively. FIG. 3(b) is a plan view schematically showing the emission surface S2 of the wavelength converter 14, and FIG. 3(a) is a cross-sectional view taken along line V-V of FIG. 3(b). With reference to FIGS. 3(a) and (b), a description will be given of the wavelength converter 14 and the antenna array 15.

The wavelength converter 14 includes a plate-shaped phosphor plate 14A containing a phosphor, and a light reflection film 14B formed on the side surface of the phosphor plate 14A. In the present embodiment, one of the principal surfaces of the phosphor plate 14A functions as the light-receiving surface S1 for receiving the secondary light L2 in the wavelength converter 14. The other principal surface of the phosphor plate 14A functions as the emission surface S2 for emitting the tertiary light L3 in the wavelength converter 14. The antenna array 15 is formed on the other principal surface of the phosphor plate 14A.

The wavelength converter 14 (in the present embodiment, the phosphor plate 14A) receives the secondary light L2 from the light-receiving surface S1, and converts the wavelength of the secondary light L2 to generate the wavelength-converted light L31. The wavelength converter 14 generates the tertiary light L3 including the transmitted light L32 which is the secondary light L2 having transmitted through the wavelength converter 14, and the wavelength-converted light L31, and emits the tertiary light L3 from the emission surface S2. In the present embodiment, the tertiary light L3 is the illumination light outputted from the illumination device 10 to the outside.

For example, the phosphor plate 14A is composed of a transparent single-phase phosphor ceramic plate made of an yttrium aluminum garnet (YAG:Ce) phosphor having cerium as a luminescence center. In addition, the phosphor plate 14A may be formed by dispersing YAG:Ce phosphor powder in a transparent binder and solidifying it.

For example, the wavelength converter 14 generates, as the wavelength-converted light L31, light having a peak in the vicinity of 550 nm and having a wavelength band (yellow) of 460 nm to 750 nm. Therefore, in the present embodiment, white light in which yellow light (wavelength-converted light L31) and blue light (transmitted light L32) have been mixed is outputted as the tertiary light L3 from the emission surface S2 of the wavelength converter 14.

The light reflection film 14B reflects the wavelength-converted light L31 and the transmitted light L32 in the phosphor plate 14A toward the emission surface S2. Thus, the light extraction efficiency from the wavelength converter 14 is improved. The light reflection film 14B comprises, for example, a metal film, an optical multilayer film, a white resin film, or the like provided on side surface of the phosphor plate 14A.

The wavelength converter 14 does not need to have the light reflection film 14B. The wavelength converter 14 may have an anti-reflection (AR) film or a dichroic mirror (not shown) formed on the light-receiving surface S1. The provision of such an anti-reflection film can improve the incidence efficiency of the secondary light L2 to the wavelength converter 14, so that the light extraction amount can be improved. In addition, the provision of the dichroic mirror can achieve reflection of the wavelength-converted light L31, which is directed to the light-receiving surface S1, toward the emission surface S2, and so the light extraction amount from the emission surface S2 can be improved.

Next, the antenna array 15 will be described. In the present embodiment, the antenna array 15 includes a plurality of optical antennas (hereinafter simply referred to as antennas) 15A formed on the emission surface S2 of the wavelength converter 14 and arranged at a period (antenna period) P larger than the optical wavelength of the transmitted light L32 (secondary light L2) in the wavelength converter 14. In the present embodiment, the plurality of antennas 15A are periodically arranged at period P of about the optical wavelength (e.g., 350 nm) of the wavelength-converted light L31 in the wavelength converter 14.

In the present embodiment, each of the plurality of antennas 15A has a columnar or conical metal protrusion. In the present embodiment, each of the antennas 15A has a cylindrical shape, and comprises a material having a plasma frequency in a visible region such as Au (gold), Ag (silver), Cu (copper), Pt (platinum), Pd (palladium), Al (aluminum), Ni (nickel) and the like, and an alloy or a laminate including any of these elements.

In the present embodiment, each of the antennas 15A has the same antenna height H and the same antenna width (diameter) W. When the antenna 15A has a columnar or conical shape, the antenna width W refers to the maximum width of the antenna 15A. In the present embodiment, the plurality of antennas 15A are arranged in a square lattice pattern on the emission surface S2 of the wavelength converter 14.

Next, the action of the antenna array 15 will be described. When each of the antennas 15A of the antenna array 15 is irradiated with the wavelength-converted light L31, localized surface plasmon resonance occurs at the surface of the antenna 15A. In addition, by setting the period P, at which the antennas 15A are arranged, to be about the optical wavelength of the wavelength-converted light L31, the wavelength-converted light L31 is caused to be diffracted, and localized surface plasmon resonance of the adjacent individual antennas 15A is induced. As a result, the electric field strength in the vicinity of the antennas 15A is increased.

As a result of this electric field enhancement, the wavelength-converted light L21 is amplified and emitted from the antenna array 15 in a narrow-angle light distribution (low etendue). That is, the antenna array 15 has a function of enhancing the wavelength-converted light L31 in the wavelength converter 14, and improving the light extraction efficiency of the wavelength-converted light L31 while narrowing the emission direction of the wavelength-converted light L31.

On the other hand, the antennas 15A are arranged at the period P larger than the optical wavelength of the transmitted light L32 (secondary light L2) in the wavelength converter 14. As a result, the above-described action (antenna action) of the antenna array 15 is not applied to the transmitted light L32. That is, the transmitted light L32 substantially passes through the antenna array 15 (without any action), and the light distribution characteristic and the irradiation shape having been adjusted by the shaping member 13 are maintained also in the illumination light.

In other words, the antenna array 15 has a function of adjusting the intensity and directivity of the wavelength-converted light L31 (for example, yellow light). On the other hand, the antenna array 15 substantially allows the secondary light L2 (e.g., blue light) that has not been wavelength-converted by the wavelength converter 14 to pass therethrough.

In the present embodiment, the antenna width W is 200±50 nm. The YAG:Ce phosphor has a refractive index of about 1.82, and the wavelength of the secondary light L2 is 450 nm. Therefore, in the present embodiment, the antenna period P is 250 nm or more. In addition, the antenna array 15 exhibits the highest light emission enhancement effect for the light in the vicinity of the optical wavelength corresponding to the antenna period P, and the enhancement effect gradually decreases toward the shorter wavelength side than the longer wavelength side. The YAG:Ce phosphor has a peak wavelength in the vicinity of 550 nm. Therefore, in order to extract a larger amount of the wavelength-converted light L31 as illumination light, the antenna period P is preferably set to be about 300 nm to 420 nm. In particular, in the antenna array 15 arranged in a square lattice pattern as in the present embodiment, the highest light emission enhancement was observed when the antenna period P was about 400 nm (optical length: 730 nm).

Figure 4:
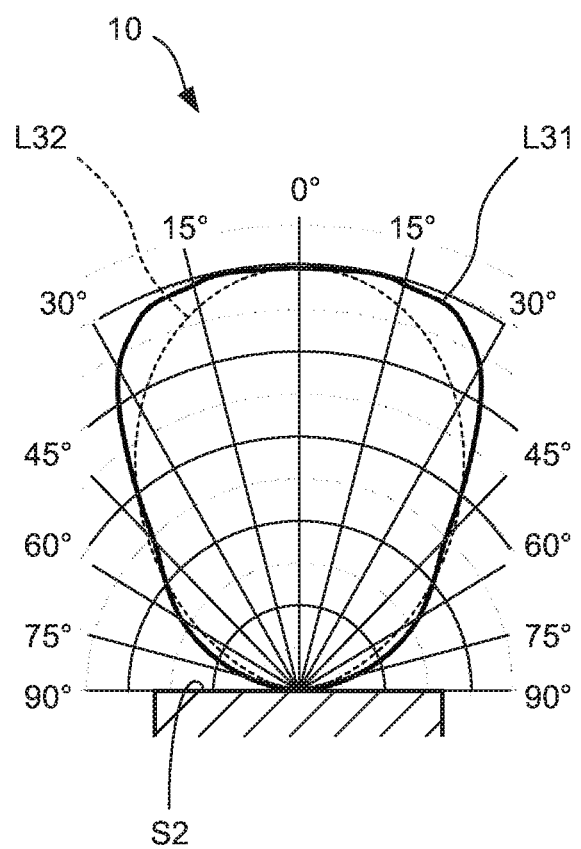
FIG. 4 is a diagram schematically showing the intensity of the light extracted from the illumination device according to the first embodiment.

FIG. 4 is a diagram schematically showing the light distributions of the wavelength-converted light L31 and the transmitted light L32 (secondary light L2), that is, the intensity (light intensity) with respect to the emission angle. FIG. 4 shows intensity distributions of the wavelength-converted light L31 and the transmitted light L32 when the normal direction (front direction) of the emission surface S2 of the wavelength converter 14 from the center of the antenna array 15 is 0° and the direction parallel to the emission surface S2 is 90°. In FIG. 4, for the purpose of explanation and comparison, the intensity (light intensity) of the wavelength-converted light L31 and the transmitted light L32 with respect to the emission angle is normalized by setting the intensity in the front direction to 1.

As shown in FIG. 4, the wavelength-converted light L31 exhibits a high intensity within a range of about 60° or less, and so the luminous fluxes are concentrated in this angular range. That is, it is shown that a large amount of light is traveling in a direction close to the direction perpendicular to the emission surface S2. Further, the intensity of the wavelength-converted light L31 was greatly improved as compared with the case where the antenna array 15 is not provided. This is considered to be due to the antenna action of the antenna array 15 described above (i.e., the improvement of the light extraction efficiency due to the enhancement of light emission and the narrow-angle emission).

On the other hand, as shown in FIG. 4, the transmitted light L32 has the substantially same light distribution characteristics as that of the secondary light L2 generated by the shaping member 13 which has been maintained. This is considered to be because the antenna array 15 is configured not to generate localized surface plasmon resonance with respect to the secondary light L2, and the wavelength converter 14 is configured by a transparent phosphor plate. Further, it is understood that the wavelength-converted light L31 and the transmitted light L32 have light distribution characteristics similar to each other. Therefore, it can be said that the tertiary light L3 is obtained by mixing the wavelength-converted light L31 and the transmitted light L32 with each other at the substantially same intensity ratio in any of the radiation directions.

As described above, in the present embodiment, the illumination device 10 includes the shaping member 13 that generates the top-hat type secondary light L2 by uniformizing the Gaussian type intensity distribution of light from the light source 12 on the light-receiving surface S1 of the wavelength converter 14, and the antenna array 15 that improves the light extraction efficiency of the wavelength-converted light L32 from the wavelength converter 14 and adds the narrow angle light distribution characteristic. As a result, the secondary light L2 is irradiated without being locally concentrated on the wavelength converter 14, and so the wavelength conversion efficiency is improved. In addition, the transmitted light L32 and the wavelength-converted light L31 can obtain light distribution characteristics similar to each other, and color unevenness of the illumination light can be reduced.

In the present embodiment, the case where the antenna array 15 comprises the plurality of antennas 15A arranged in a square lattice pattern has been described, but the arrangement form of the antennas 15A is not limited to this. For example, the respective antennas 15A of the antenna array 15 may be arranged in a hexagonal lattice pattern.

Figure 5:
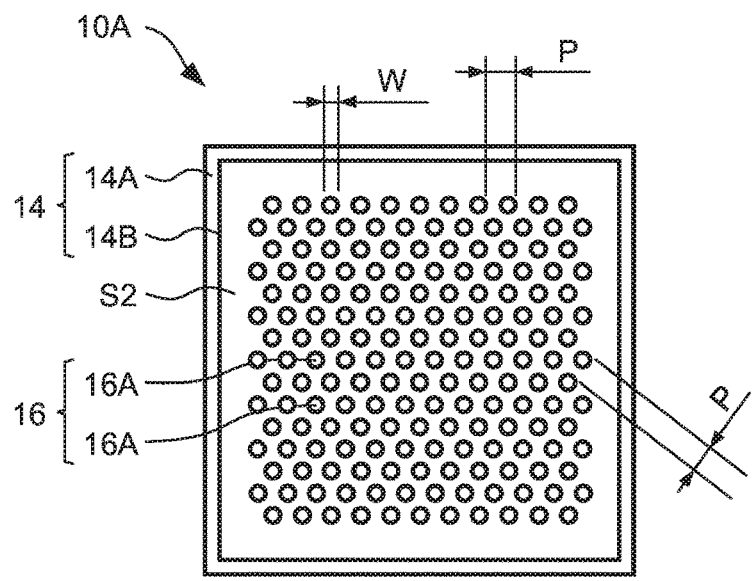
FIG. 5(a) schematic top view of a wavelength converter and an antenna array of an illumination device according to a modified example of the first embodiment and FIG. 5(b) is a diagram schematically showing the intensity of the light extracted from the illumination device according to the modified example of the first embodiment.
Figure 5:
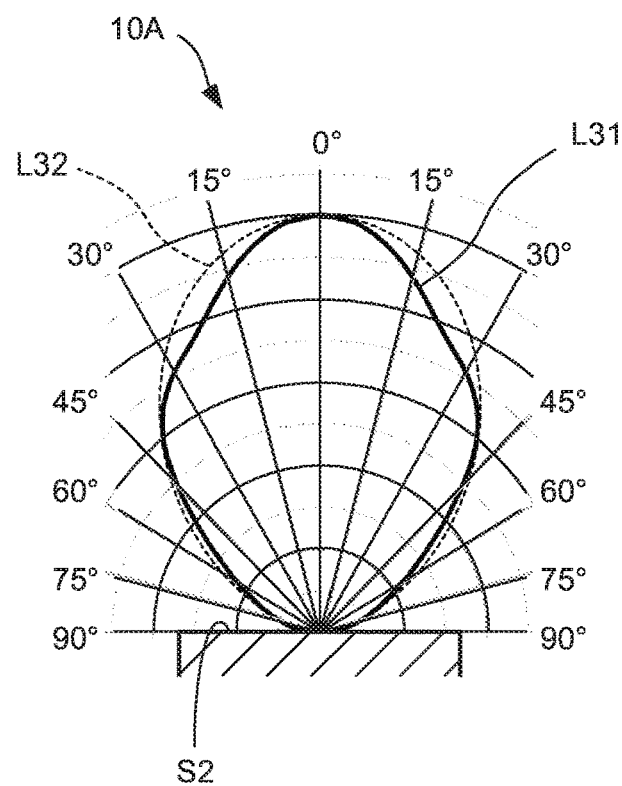

FIG. 5(a) is a diagram schematically showing a configuration of an antenna array 16 of an illumination device 10A according to a modified example of the first embodiment. FIG. 5(a) is a plan view schematically showing the emission surface S2 of the wavelength converter 14 in the illumination device 10A. The illumination device 10A has the same configuration as that of the illumination device 10 except for the configuration of the antenna array 16. The illumination device 10A includes the antenna array 16 formed on the emission surface S2 of the wavelength converter 14.

In this modified example, the antenna array 16 includes a plurality of antennas 16A having the same configuration as that of the plurality of antennas 15A of the antenna array 15 except that the antennas are arranged in a hexagonal lattice pattern (triangular lattice pattern). As in the present modified example, the respective antennas 16A of the antenna array 16 may be arranged in a hexagonal lattice pattern.

FIG. 5(b) is a diagram schematically showing the light distributions of the wavelength-converted light L31 and the transmitted light L32 emitted from the illumination device 10A, that is, the intensity (light intensity) with respect to the emission angle. As shown in FIG. 5(b), even when the plurality of antennas 16A are arranged in a hexagonal lattice pattern with an antenna period P of 350 nm, the antenna array 16 exhibits the antenna function with respect to the wavelength-converted light L31 similarly to the antenna array 15, and a narrow angle light distribution similar to the light distribution of the transmitted light L32 can be obtained. In FIG. 5(b), the intensity (light intensity) of the wavelength-converted light L31 and the transmitted light L32 with respect to the emission angle is normalized by setting the intensity in the front direction to 1 as in FIG. 4.

In the present embodiment and its modified examples, for example, the antenna array 15 has been described in the case where the respective antennas 15A are arranged at the period P of about the optical wavelength in the wavelength converter 14 of the wavelength-converted light L31. However, in the antenna array 15, the plurality of antennas 15A only need to be arranged at a period P larger than the optical wavelength of the secondary light L2 in the wavelength converter 14. That is, the antenna array 15 only needs to be arranged at a period P in which the antenna array 15 applies the antenna action to the wavelength-converted light L31 and allows the secondary light L2 to substantially transmit therethrough.

In the present embodiment, the case where the light source 12 is a laser light source has been described. However, the light source 12 is not limited to the case of the laser light source. For example, the light source 12 may comprise a light emitting diode. The light source 12 may comprise a combination of a semiconductor laser and a light emitting diode.

In consideration of obtaining the wavelength-converted light L31 and the transmitted light L32 having high directivity as the tertiary light L3, it is preferable that the light source 12 be a laser light source. Further, even when a laser light source is used as the light source 12, since the intensity distribution of the secondary light L2 on the light-receiving surface S2 is adjusted to the top-hat type by the shaping member 13, concentrated irradiation of the laser light to a part of the wavelength converter 14 is suppressed. Therefore, temperature quenching that may occur in a partial region of the wavelength converter 14 is eliminated, and there is no risk that the wavelength conversion efficiency is lowered and the laser light is directly radiated to the outside.

In the present embodiment and its modified example, the illumination device 10 (or 10A) includes the light source 12 for generating the primary light L1 having a Gaussian intensity distribution, and the shaping member 13 for shaping the primary light L2 to generate the secondary light L2 having a top-hat intensity distribution.

In addition, the illumination device 10 (or 10A) has: the wavelength converter 14 that receives the secondary light L2 from the light-receiving surface S1, generates the tertiary light L3 including the secondary light L2 (transmitted light L32) and the wavelength-converted light L31 in which the wavelength of the secondary light L2 has been converted, and emits the tertiary light L3 from the emission surface S2; and the antenna array 15 having the plurality of antennas 15A formed on the emission surface S2 of the wavelength converter 14 and arranged at a period P larger than the optical wavelength of the secondary light L2 in the wavelength converter 14.

Accordingly, by increasing the wavelength conversion efficiency and the light extraction efficiency of the wavelength converter 14 and independently adjusting the light distributions of the transmitted light L32 and the wavelength-converted light L31 to the narrow-angle light distributions by the shaping member 13 and the antenna array 15, respectively, it is possible to provide the illumination device 10 capable of emitting the illumination light (mixed light) with the narrow-angle light distributions and without color unevenness.

Second Embodiment

Figure 6:
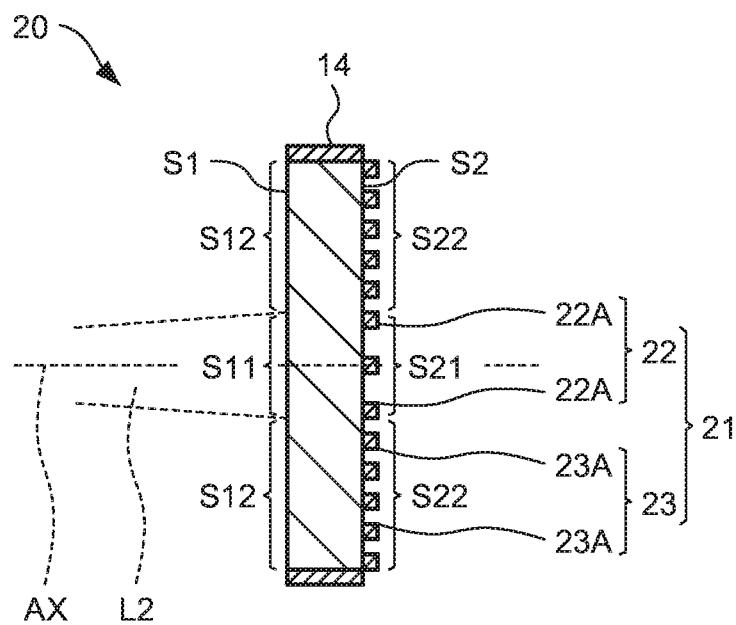
FIGS. 6(a) and 6(b) are a schematic cross-sectional view and a top view of a wavelength converter and an antenna array of an illumination device according to a second embodiment, respectively.
Figure 6:
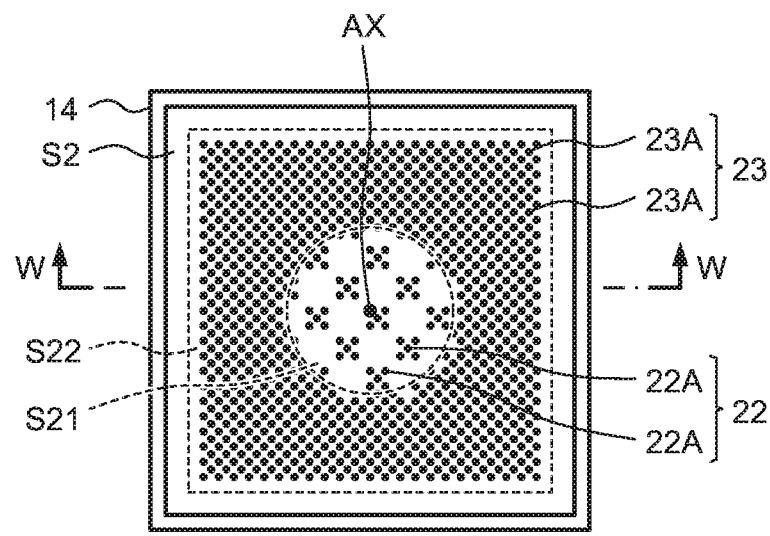

FIGS. 6(a) and (b) are a schematic cross-sectional view and a top view of an illumination device 20 according to a second embodiment, respectively. FIG. 6(a) is a cross-sectional view taken along line W-W of FIG. 6(b). With reference to FIGS. 6(a) and (b), a description will be given of a configuration of the illumination device 20. The illumination device 20 has the same configuration as that of the illumination device 10 except for the configuration of an antenna array 21. The antenna array 21 has first and second sub-arrays 22 and 23 having different antenna occupancy ratios.

Specifically, the light-receiving surface S1 of the wavelength converter 14 has an irradiated region S11 irradiated with the secondary light L2 and a peripheral region S12 provided around the irradiated region S11. The emission surface S2 of the wavelength converter 14 has a first emission region S21 corresponding to the irradiated region S11 of the light-receiving surface S1 and a second emission region S22 corresponding to the peripheral region S12.

In the present embodiment, the irradiated region S11 is a circular region including a region on the optical axis AX of the secondary light L2 on the light-receiving surface S1, and the first emission region S21 is a region of the emission surface S2 facing the irradiated region S11. The peripheral region S12 is a region of the light-receiving surface S1 provided in the outer peripheral portion of the irradiated region S11, and the second emission region S22 is a region of the emission surface S2 facing the peripheral region S12.

In the present embodiment, the antenna array 21 includes a first sub-array 22 comprising a plurality of antennas 22A arranged on the first emission region S21 of the emission surface S2, and a second sub-array 23 comprising a plurality of antennas 23A arranged on the second emission region S22 and having a larger antenna occupancy ratio per unit area than that of the first sub-array 22. At least the antennas 22A are arranged at a period larger than the optical wavelength of the secondary light L2 in the wavelength converter 14.

For example, in the present embodiment, the respective antennas 22A of the first sub-array 22 are arranged at a larger period P than that at which the respective antennas 23A of the second sub-array 23 are arranged. The first sub-array 22 has a structure in which a region where the antennas 22A are provided and a region where the antennas 22A are not provided are arranged in a staggered manner. The antenna 23A may be formed to have an antenna width W (see FIG. 3(b)) larger than that of the antenna 22A.

Figure 7:
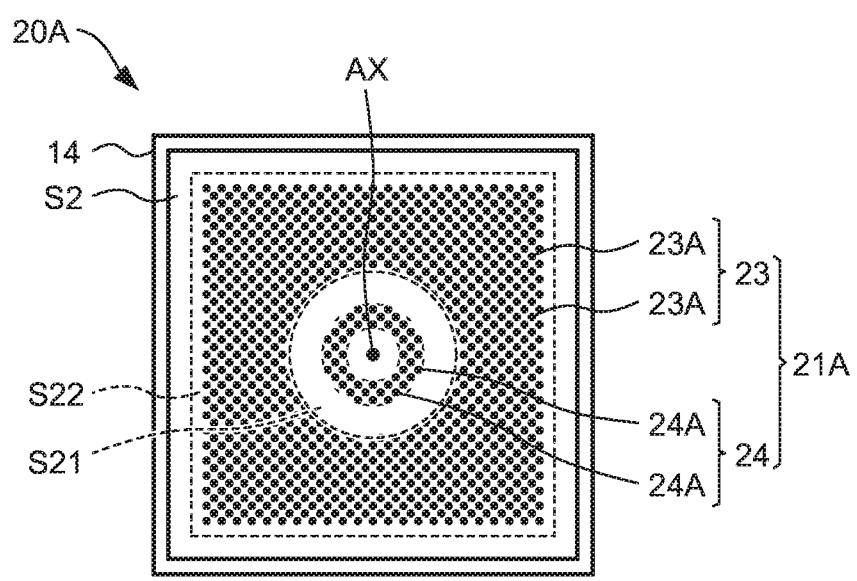
FIG. 7 is a schematic top view of a wavelength converter and an antenna array of an illumination device according to a modified example of the second embodiment.

FIG. 7 is a diagram schematically showing a configuration of an antenna array 21A of an illumination device 20A according to a modified example of the second embodiment. The illumination device 20A has the same configuration as that of the illumination device 20 except for the configuration of the antenna array 21A. FIG. 7 is a plan view schematically showing the emission surface S2 of the wavelength converter 14 in the illumination device 20A.

In the present modified example, the antenna array 21A has the same configuration as that of the antenna array 21 except for the configuration of the first sub-array 24. The antenna array 21A includes a first sub-array 24 comprising a plurality of antennas 24A provided on the first emission region S21, and a second sub-array 23. In this modified example, the first sub-array 24 has a structure in which a region in which the antennas 24A are provided and a region in which the antenna 24A is not provided are arranged concentrically.

In the present embodiment and its modified example, the antenna occupancy ratio in the first emission region S21 of the wavelength converter 14, that is, the region on the emission surface S2 including the region on the optical axis AX of the secondary light L2 is made smaller than those in other regions. As a result, a larger amount of the transmitted light L32, that is, a larger amount of the secondary light L2 transmitted through the wavelength converter 14 is transmitted through the first emission region S21.

Specifically, for example, the antennas 22A or 23A constituting the antenna array 21 may absorb a part of the secondary light L2 or scatter backward. Therefore, by reducing the area occupied by the antennas 23A in the first emission region S21, which is a region through which a relatively larger amount of the secondary light L2 passes, absorption or scattering of the secondary light L2 by the antenna array 21 can be suppressed. Therefore, the light extraction efficiency of the transmitted light L32 can be improved.

The wavelength-converted light L31 diffuses in the wavelength converter 14. Therefore, the wavelength-converted light L31 that has not been emitted from the first emission region S21 is emitted to the outside through the second sub-array 23.

In consideration of maintaining the transmission efficiency and the light distribution characteristic of the secondary light L2, the wavelength converter 14 (i.e., the phosphor plate 14A) is preferably formed of a transparent member.

As described above, in the present embodiment and its modified example, the emission surface S2 of the wavelength converter 14 has the first emission region S21 corresponding to the irradiated region S11 of the secondary light L2 on the light-receiving surface S1 and the second emission region S22 corresponding to the peripheral region S12. The antenna array 21 or 21A has the first sub-array 22 or 24 comprising the plurality of antennas 22A or 24A arranged on the first emission region S21 of the emission surface S2, and the second sub-array 23 comprising the plurality of antennas 23A arranged on the second emission region S22 and having a larger antenna occupancy ratio per unit area than that of the first sub-array 22 or 24A. Therefore, it is possible to provide the highly efficient illumination device 20 or 20A in which the light extraction efficiency of the transmitted light L31 in the region of the antenna array 21 on the wavelength converter 14 through which the secondary light L2 passes is locally improved.

Third Embodiment

Figure 8:
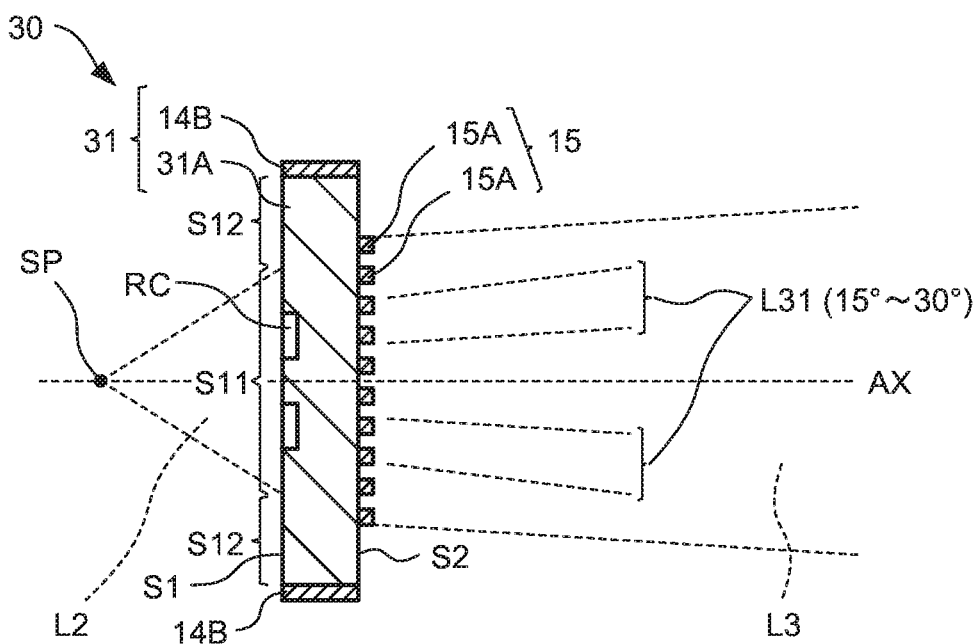
FIGS. 8(a) and 8(b) are a schematic cross-sectional view and a plan view of a wavelength converter and an antenna array of an illumination device according to a third embodiment, respectively.
Figure 8:
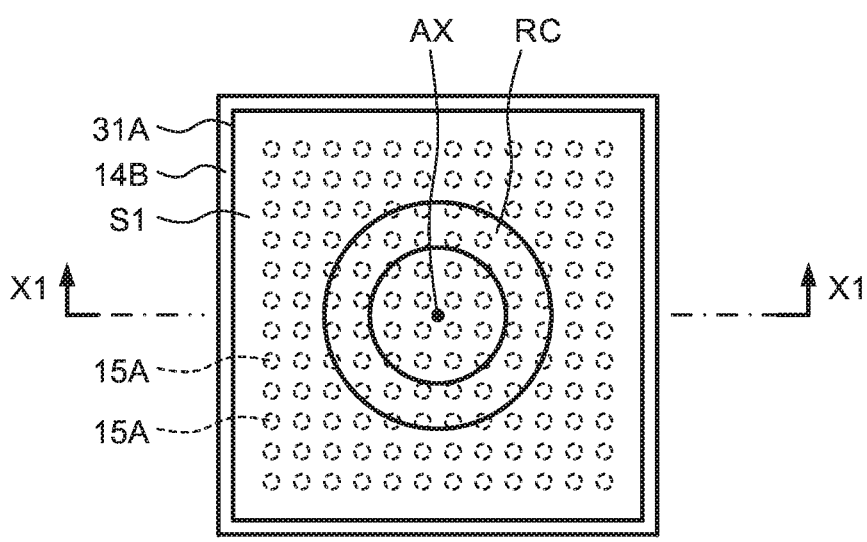

FIGS. 8(a) and are a schematic cross-sectional view and a plan view of a wavelength converter 31 of an illumination device 30 according to a third embodiment, respectively. FIG. 8(b) is a plan view schematically showing the light-receiving surface S1 of the wavelength converter 31 of the illumination device 30. FIG. 8(a) is a cross-sectional view taken along line X1-X1 of FIG. 8(b). The illumination device 30 has the same configuration as that of the illumination device 10 except for the configuration of the wavelength converter 31. The wavelength converter 31 has the same configuration as that of the wavelength converter 14 except for the configuration of a phosphor plate 31A.

In the present embodiment, the secondary light L2 is configured to be radially emitted from the shaping member 13 with the emission point SP as a focal point. By configuring so, it can be considered as if the secondary light L2 were emitted from the point light source having the emission point SP as the emission portion. The emission point SP of the secondary light L2 is formed between the shaping member 13 and the light-receiving surface S1 of the wavelength converter 31 by using the shaping member 13 formed by combining an appropriate homogenizer member and an aspheric lens, for example.

In the present embodiment, the wavelength converter 31 has an irradiated region. S11 of the secondary light L2 and a peripheral region S12 thereof on the light-receiving surface S1. In addition, the wavelength converter 31 has a recessed portion RC provided rotationally symmetrically with respect to the optical axis AX of the secondary light L2 in the irradiated region S11 of the light-receiving surface S1. In the present embodiment, the phosphor plate 31A constitutes the light-receiving surface S1, and the recessed portion RC is formed on the principal surface of the phosphor plate 31A.

In the present embodiment, the recessed portion RC is provided in an annular shape so as to surround a region on the optical axis AX of the secondary light L2. The formation region of the recessed portion RC corresponds to a region in which the emission point SP and the emission angle of the transmitted light L32 emitted from the wavelength converter 31 are in the range of 15° to 30°.

In the present embodiment, the color unevenness of the tertiary light L3 when the illumination device 10 according to the first embodiment is adopted, that is, the antennas 15A are arranged in a square lattice pattern, is made more uniform. Specifically, as shown in FIG. 4, the wavelength-converted light L31 of the tertiary light L3 from the illumination device 10 has a slightly larger intensity ratio than the transmitted light L32 (secondary light L2) in the range of the emission angle of 15° to 30°. That is, the resulting tertiary light L3 becomes the mixed color light of which color temperature in the range of the emission angle of 15° to 30° is lower than that in the periphery. The recessed portion RC of the wavelength converter 31 has a function of reducing this slight difference in intensity ratio, that is, of shaping the light distribution of the wavelength-converted light L31 and the transmitted light L32 into a more similar shape.

More specifically, the recessed portion RC of the wavelength converter 31 shortens the optical path of the secondary light L2 corresponding to the wavelength-converted light L31 having the emission angle in the range of 15° to 30° in the wavelength converter 31. Accordingly, the secondary light. L2 converted into the wavelength-converted light L31 in the angular range decreases, and the component of the transmitted light L32 in this angular range increases. As a result, the intensity ratio between the wavelength-converted light L31 and the transmitted light L32 can be made uniform with high accuracy over the entire angular range.

As described above, in the present embodiment, the antenna array 15 of the illumination device 30 comprises the plurality of antennas 15A arranged in a square lattice pattern. In addition, the wavelength converter 31 has the recessed portion RC provided rotationally symmetrically with respect to the optical axis AX of the secondary light L2 in the irradiated region S11 of the light-receiving surface S1. Accordingly, it is possible to provide the illumination device 30 capable of suppressing color unevenness and obtaining high directivity and light extraction efficiency.

Figure 9:
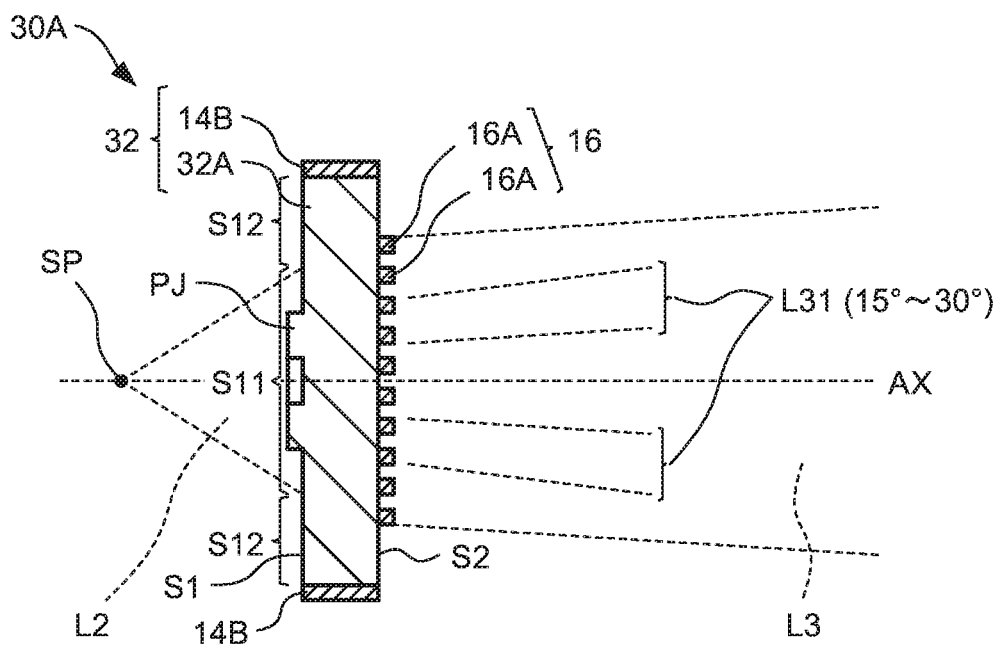
FIGS. 9(a) and 9(b) are a schematic cross-sectional view and a plan view of a wavelength converter and an antenna array of an illumination device according to a modified example of the third embodiment, respectively.
Figure 9:
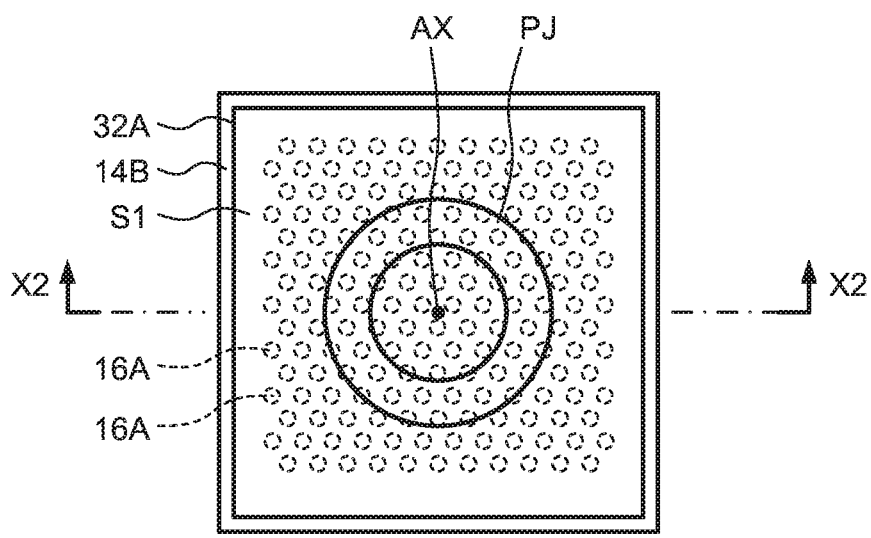

FIGS. 9(a) and (b) are a schematic cross-sectional view and a plan view of a wavelength converter 32 of an illumination device 30A according to a modified example of the third embodiment, respectively. FIG. 9(b) is a plan view schematically showing the light-receiving surface S1 of the wavelength converter 32 of the illumination device 30A. FIG. 9(a) is a cross-sectional view taken along line X2-X2 of FIG. 9(b). The illumination device 30A has the same configuration as that of the illumination device 10A except for the configuration of the wavelength converter 32. The wavelength converter 32 has the same configuration as that of the wavelength converter 14 except for the configuration of a phosphor plate 32A.

In the present modified example, the wavelength converter 32 has an irradiated region S11 of the secondary light L2 and a peripheral region S12 thereof on the light-receiving surface S1. The wavelength converter 32 has a projected portion PJ provided rotationally symmetrically with respect to the optical axis AX of the secondary light L2 in the irradiated region S11 of the light-receiving surface S1. In the present modified example, the phosphor plate 32A constitutes the light-receiving surface S1, and the projected portion PJ is formed on the principal surface of the phosphor plate 32A.

In the present modified example, the projected portion PJ is provided in an annular shape so as to surround a region on the optical axis AX of the secondary light L2. The region in which the projected portion PJ is formed corresponds to a region in which the emission angle of the wavelength-converted light L31 emitted from the wavelength converter 32 is in the range of 15° to 30°.

In the present modified example, the color unevenness of the tertiary light L3 when the illumination device 10A according to the modified example of the first embodiment is adopted, that is, the antennas 16A are arranged in a hexagonal lattice pattern is made more uniform. Specifically, as shown in FIG. 5(b), the wavelength-converted light L31 of the tertiary light L3 from the illumination device 10A has an intensity ratio slightly smaller than that of the transmitted light L32 (secondary light L2) in the range of the emission angle of 15° to 30°. The projected portion PJ of the wavelength converter 32 has a function of reducing this slight difference in intensity ratio, that is, of shaping the light distribution of the wavelength-converted light L31 and the transmitted light L32 into a more similar shape.

In the present modified example, the projected portion PJ of the wavelength converter 32 lengthens the optical path of the secondary light L2 corresponding to the wavelength-converted light L31 having the emission angle in the range of 15° to 30° in the wavelength converter 32. Therefore, in the present modified example, the secondary light L2 converted into the wavelength-converted light L31 in the angular range increases, and the component of the transmitted light L32 in the angular range decreases. As a result, the intensity ratio between the wavelength-converted light L31 and the transmitted light L32 can be made uniform with high accuracy over the entire angular range.

As described above, in the present modified example, the antenna array 16 of the illumination device 30A comprises the plurality of antennas 16A arranged in a hexagonal lattice pattern. The wavelength converter 32 has the projected portion PJ provided rotationally symmetrically with respect to the optical axis AX of the secondary light L2 in the irradiated region S11 of the light-receiving surface S1. Accordingly, it is possible to provide the illumination device 30A capable of suppressing color unevenness and obtaining high directivity and light extraction efficiency.

Fourth Embodiment

Figure 10:
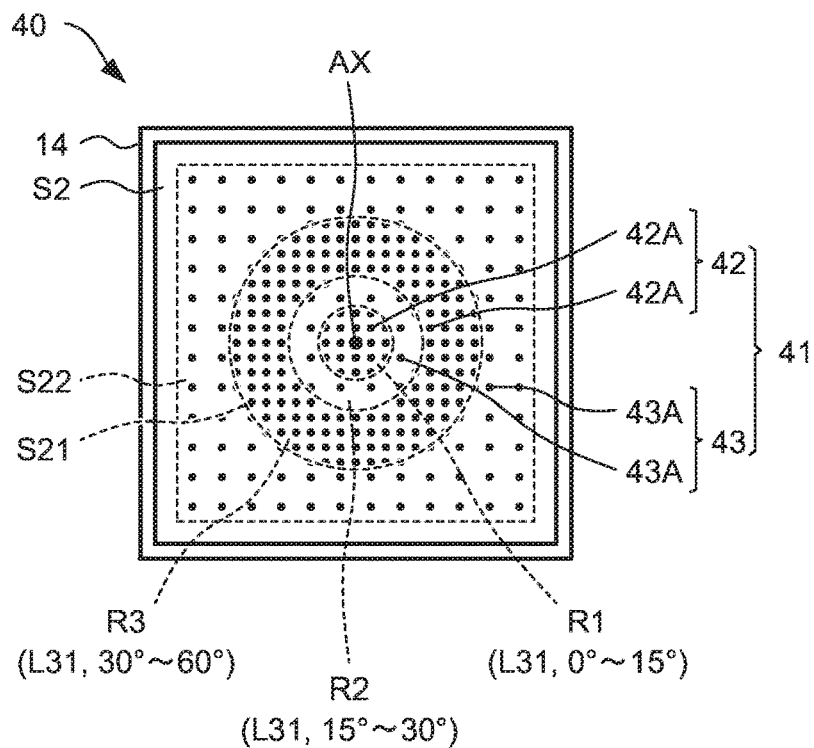
FIGS. 10(a) and 10(b) are schematic plan views of wavelength converters and antenna arrays of illumination devices according to a fourth embodiment and a modified example of the fourth embodiment, respectively.
Figure 10:
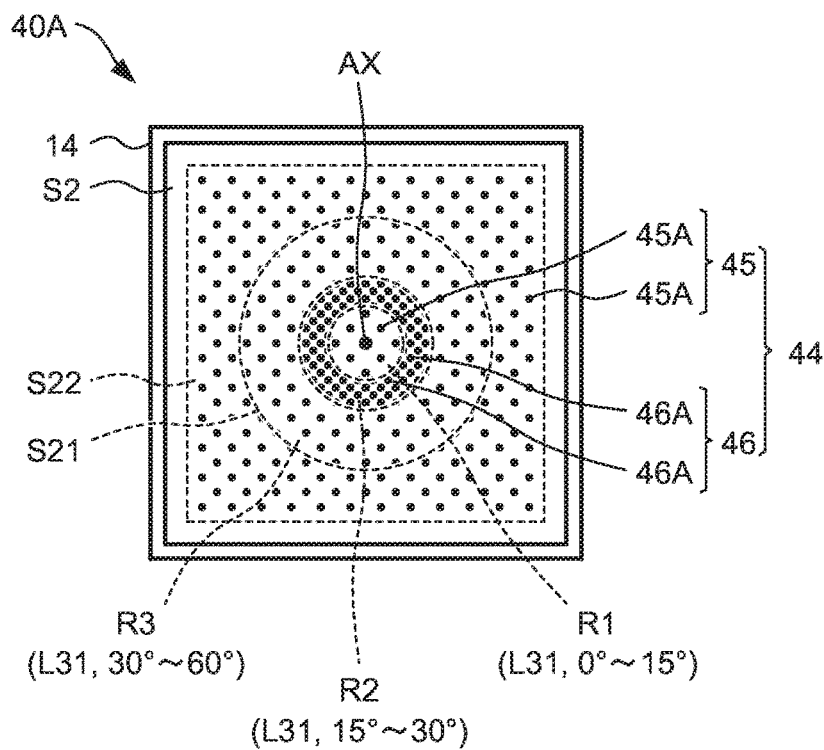

FIG. 10(a) is a diagram schematically showing a configuration of an antenna array 41 of an illumination device 40 according to a fourth embodiment. The illumination device 40 has the same configuration as that of the illumination device 10 or 20 except for the configuration of the antenna array 41. FIG. 10(a) is a plan view schematically showing the emission surface S2 of the wavelength converter 14 in the illumination device 40.

In the present embodiment, for example, similarly to the illumination device 20 (for example, FIG. 6(a)), the light-receiving surface S1 of the wavelength converter 14 has an irradiated region S11 irradiated with the secondary light L2 and a peripheral region S12 provided around the irradiated region S11. The emission surface S2 of the wavelength converter 14 has a first emission region S21 corresponding to the irradiated region S11 and a second emission region S22 corresponding to the peripheral region S12.

In the present embodiment, the first emission region S21 includes a center region R1 including a region on the optical axis AX of the secondary light L2, and an annular region R2 surrounding the center region R1. In the present embodiment, the first emission region S21 has the annular region R2 as an inner annular region and an outer annular region R3 surrounding the inner annular region R2.

in the present embodiment, the center region R1 corresponds to a region in which the emission angle of the wavelength-converted light L31 is in the range of 0° to 15°. The inner annular region R2 corresponds to a region in which the emission angle of the wavelength-converted light L31 is in the range of 15° to 30°. The outer annular region R3 corresponds to a region in which the emission angle of the wavelength-converted light L31 is in the range of 30° to 60°.

The antenna array 41 has a first sub-array 42 comprising a plurality of antennas 42A arranged in a square lattice pattern in the center region R1 of the first emission region S21, and a second sub-array 43 comprising a plurality of antennas 43A arranged in a square lattice pattern in the annular region (inner annular region) R2 surrounding the center region R1 and having a smaller antenna occupancy ratio per unit area than that of the first sub-array 42.

More specifically, similarly to the third embodiment, the purpose of the present embodiment is to eliminate the color unevenness of the tertiary light L3 with high accuracy based on the arrangement form of the antennas. In the present embodiment, the intensity is adjusted according to the emission angle of the transmitted light L32 according to the density (occupancy ratio) of the antennas.

The antenna array 41 includes antennas 42A and 43A arranged in a square lattice pattern in both the first and second sub-arrays 42 and 43. Therefore, as shown in FIG. 4, the intensity ratio of the wavelength-converted light L31 is slightly larger than that of the transmitted light L32 (secondary light L2) in the range of the emission angle of 15° to 30°.

Therefore, by making the occupancy ratio of the antennas 43A relatively small the annular region R2 which is the region of the emission surface S2 corresponding to the angular range, the transmitted light L32 scattered or absorbed by the antennas 43A can be made slightly small. Accordingly, it is possible to provide the illumination device 40 capable of suppressing color unevenness and obtaining high directivity and light extraction efficiency.

In the present embodiment, the first sub-array 42 is formed not only in the center region R1 but also in the outer annular region R3. The second sub-array 43 is formed not only in the inner annular region R2 but also in the second emission region S2. As a result, the intensity ratio between the wavelength-converted light L31 and the transmitted light L32 can be made uniform with high accuracy over the entire angular range.

FIG. 10(b) is a diagram schematically showing a configuration of an antenna array 44 of an illumination device 40A according to a modified example of the fourth embodiment. The illumination device 40A has the same configuration as that of the illumination device 10A or 20 except for the configuration of the antenna array 44. FIG. 10(b) is a plan view schematically showing the emission surface S2 of the wavelength converter 14 in the illumination device 40A.

In the present modified example, similarly to the illumination device 40, the light-receiving surface S1 of the wavelength converter 14 has an irradiated region S11 irradiated with the secondary light L2 and a peripheral region S12 provided around the irradiated region S11. The emission surface S2 of the wavelength converter 14 has a first emission region S21 corresponding to the irradiated region S11 and a second emission region S22 corresponding to the peripheral region S12.

The first emission region S21 has a center region R1 including a region on the optical axis AX of the secondary light L2, and an annular region R2 surrounding the center region R1. The first emission region S21 has the annular region R2 as an inner annular region and an outer annular region R3 surrounding the inner annular region R2.

In the present modified example, the antenna array 44 includes a first sub-array 45 comprising a plurality of antennas 45A arranged in a hexagonal lattice pattern in the center region R1 of the first emission region S21, and a second sub-array 46 comprising a plurality of antennas 46A arranged in a hexagonal lattice pattern in the annular region (inner annular region) R2 surrounding the center region R1 and having a larger antenna occupancy ratio per unit area than that of the first sub-array 45.

In the antenna array 44, both the first and second sub-arrays 45 and 46 include the antennas 45A and 46A arranged in a hexagonal lattice pattern, respectively. Therefore, as shown in FIG. 5(b), the intensity of the wavelength-converted light L31 is slightly smaller than that of the transmitted light L32 (secondary light L2) in the range of the emission angle of 15° to 30°.

Therefore, in the present modified example, by making the occupancy ratio of the antennas 46A relatively larger in the annular region R2 which is the region of the emission surface 52 corresponding to the angle range, the amount of the secondary light L2 absorbed or scattered by the antennas 46A can be slightly increased. Accordingly, it is possible to provide the illumination device 40A capable of suppressing color unevenness and obtaining high directivity and light extraction efficiency.

In the present embodiment, the first sub-array 42 is formed not only in the center region R1 but also in a region other than the annular region R2 of the emission surface 52, that is, on the annular region R3 and the second emission region S22. Accordingly, it is possible to obtain the tertiary light L3 having an intensity that is highly accurately uniformized over the entire emission surface 52.

As described above, in the present embodiment and its modified example, the illumination devices 40 and 40A have a configuration in which the first emission region S21 of the emission surface S2 is distinguished into a plurality of regions, and the antenna occupancy ratio is adjusted for each of the plurality of regions. Therefore, color unevenness can be suppressed, and high directivity and light extraction efficiency can be obtained.

REFERENCE SIGNS LIST 10, 10A, 20, 20A, 30, 30A, 40, 40A illumination device
12 light source
13 shaping member
14, 31, 32 wavelength converter
15, 16, 21, 21A, 41, 44 antenna array

The invention claimed is:
1. An illumination device comprising:
a light source configured to generate primary light having a Gaussian intensity distribution;
an intensity-distribution converting member configured to convert the primary light to generate secondary light having a top-hat type intensity distribution;

a wavelength converter configured to receive the secondary light from a light-receiving surface, generate tertiary light including the secondary light and wavelength-converted light in which a wavelength of said secondary light has been converted, and emit the tertiary light from an emission surface; and an antenna array having a plurality of optical antennas formed on said emission surface of said wavelength converter and arranged at a period larger than an optical wavelength of the secondary light in said wavelength converter, wherein:

said light-receiving surface of said wavelength converter has an irradiated region irradiated with the secondary light and a peripheral region provided around said irradiated region, said emission surface of said wavelength converter has a first emission region corresponding to said irradiated region and a second emission region corresponding to said peripheral region, and said antenna array includes a first sub-array comprising a plurality of optical antennas arranged on said first emission region of said emission surface, and a second sub-array comprising a plurality of optical antennas arranged on said second emission region and having a larger antenna occupancy ratio per unit area than that of said first sub-array.

2. An illumination device comprising:

a light source configured to generate primary light having a Gaussian intensity distribution;

an intensity-distribution converting member configured to convert the primary light to generate secondary light having a top-hat type intensity distribution;

a wavelength converter configured to receive the secondary light from a light-receiving surface, generate tertiary light including the secondary light and wavelength-converted light in which a wavelength of said secondary light has been converted, and emit the tertiary light from an emission surface; and an antenna array having a plurality of optical antennas formed on said emission surface of said wavelength converter and arranged at a period larger than an optical wavelength of the secondary light in said wavelength converter, wherein:

said antenna array is arranged in a square lattice pattern on said emission surface, said light-receiving surface of said wavelength converter has an irradiated region irradiated with the secondary light and a peripheral region provided around said irradiated region, and said wavelength converter has a recessed portion provided rotationally symmetrically with respect to an optical axis of the secondary light in said irradiated region of said light-receiving surface.

3. An illumination device comprising:

a light source configured to generate primary light having a Gaussian intensity distribution;

an intensity-distribution converting member configured to convert the primary light to generate secondary light having a top-hat type intensity distribution;

a wavelength converter configured to receive the secondary light from a light-receiving surface, generate tertiary light including the secondary light and wavelength-converted light in which a wavelength of said secondary light has been converted, and emit the tertiary light from an emission surface; and an antenna array having a plurality of optical antennas formed on said emission surface of said wavelength converter and arranged at a period larger than an optical wavelength of the secondary light in said wavelength converter, wherein:

said antenna array is arranged in a hexagonal lattice pattern on said emission surface, said light-receiving surface of said wavelength converter has an irradiated region irradiated with the secondary light and a peripheral region provided around said irradiated region, and said wavelength converter has a projected portion provided rotationally symmetrically with respect to an optical axis of the secondary light in said irradiated region of said light-receiving surface.

4. The illumination device according to claim 1, wherein said intensity-distribution converting member comprises a beam homogenizer.

5. The illumination device according to claim 2, wherein said intensity-distribution converting member comprises a beam homogenizer.

6. The illumination device according to claim 3, wherein said intensity-distribution converting member comprises a beam homogenizer.

7. The illumination device according to claim 1, wherein said light source is a laser light source configured to generate laser light as the primary light.

8. The illumination device according to claim 2, wherein said light source is a laser light source configured to generate laser light as the primary light.

9. The illumination device according to claim 3, wherein said light source is a laser light source configured to generate laser light as the primary light.

10. The illumination device according to claim 4, wherein said light source is a laser light source configured to generate laser light as the primary light.

11. The illumination device according to claim 5, wherein said light source is a laser light source configured to generate laser light as the primary light.

12. The illumination device according to claim 6, wherein said light source is a laser light source configured to generate laser light as the primary light.

13. The illumination device according to claim 1, wherein each of the plurality of antennas is made of metal with a columnar or conical shape.

14. The illumination device according to claim 2, wherein each of the plurality of antennas is made of metal with a columnar or conical shape.

* * * * *